(12) United States Patent
Schlarman

(10) Patent No.: US 11,330,001 B2
(45) Date of Patent: May 10, 2022

(54) PLATFORM FOR THE EXTRACTION OF OPERATIONAL TECHNOLOGY DATA TO DRIVE RISK MANAGEMENT APPLICATIONS

(71) Applicant: EMC IP Holding Company LLC, Hopkinton, MA (US)

(72) Inventor: Steven G. Schlarman, Shawnee, KS (US)

(73) Assignee: EMC IP Holding Company LLC, Hopkinton, MA (US)

(*) Notice: Subject to any disclaimer, the term of this patent is extended or adjusted under 35 U.S.C. 154(b) by 408 days.

(21) Appl. No.: 16/527,981

(22) Filed: Jul. 31, 2019

(65) Prior Publication Data

US 2021/0037025 A1    Feb. 4, 2021

(51) Int. Cl.
*H04L 9/40* (2022.01)
*H04L 29/06* (2006.01)

(52) U.S. Cl.
CPC ...... *H04L 63/1416* (2013.01); *H04L 63/0421* (2013.01); *H04L 63/1425* (2013.01)

(58) Field of Classification Search
USPC ........................................................... 726/22
See application file for complete search history.

(56) References Cited

U.S. PATENT DOCUMENTS

| | | | | |
|---|---|---|---|---|
| 8,478,628 B1 * | 7/2013 | Schlarman | ............. | G06Q 10/06 705/7.11 |
| 10,673,880 B1 * | 6/2020 | Pratt | .................. | H04L 63/1425 |
| 2014/0380488 A1 * | 12/2014 | Datta Ray | ........... | H04L 63/1433 726/25 |

(Continued)

FOREIGN PATENT DOCUMENTS

| | | | | |
|---|---|---|---|---|
| CA | 2388624 C | * | 7/2011 | ............... G06F 8/20 |
| EP | 3304858 B1 | * | 3/2021 | ............. H04L 43/04 |
| WO | WO-2014047069 A1 | * | 3/2014 | ............. G06F 21/00 |

OTHER PUBLICATIONS

Wikipedia, "Dynamic Host Configuration Protocol," https://en.wikipedia.org/wiki/Dynamic_Host_Configuration_Protocol, Jul. 19, 2019, 22 pages.

(Continued)

*Primary Examiner* — Sakinah White Taylor
(74) *Attorney, Agent, or Firm* — Ryan, Mason & Lewis, LLP

(57) ABSTRACT

A method in one embodiment includes receiving usage data from a first operational management system, the first operational management system utilizing a plurality of assets of an information technology infrastructure. The method also includes identifying, based at least in part on the received usage data, one or more asset relationships between at least two assets of the plurality of assets, and one or more user-asset relationships between one or more users and one or more of the plurality of assets. In the method, one or more parameters of a plurality of parameters are applied to the identified asset and user-asset relationships to determine one or more designations associated with the identified asset and user-asset relationships. The one or more designations are transmitted to a second operational management system to trigger a risk management workflow based at least in part on the one or more designations.

20 Claims, 5 Drawing Sheets

(56) References Cited

U.S. PATENT DOCUMENTS

| | | | | |
|---|---|---|---|---|
| 2016/0012465 A1* | 1/2016 | Sharp | ............... | G06Q 20/321 |
| | | | | 705/14.17 |
| 2016/0379296 A1* | 12/2016 | Yu | ............... | G06Q 30/02 |
| | | | | 705/7.13 |
| 2017/0041296 A1* | 2/2017 | Ford | ............... | G06F 16/951 |
| 2017/0201850 A1* | 7/2017 | Raleigh | ............... | H04W 4/50 |
| 2018/0285204 A1* | 10/2018 | Dwarampudi | ............... | G06F 16/116 |
| 2019/0340684 A1* | 11/2019 | Belanger | ............... | G06N 7/005 |
| 2020/0036803 A1* | 1/2020 | Galchenko | ............... | H04L 65/4053 |

OTHER PUBLICATIONS

Wikipedia, "Lightweight Directory Access Protocol," https://en.wikipedia.org/wiki/Lightweight_Directory_Access_Protocol, Jun. 17, 2019, 12 pages.

* cited by examiner

PLATFORM FOR THE EXTRACTION OF OPERATIONAL TECHNOLOGY DATA TO DRIVE RISK MANAGEMENT APPLICATIONS

FIELD

The field relates generally to information processing systems, and more particularly to risk management in information processing systems.

BACKGROUND

Risk, security and compliance products must evolve to include solutions which keep pace with technological developments used by modern enterprises. For example, traditional approaches for managing risk are not adequate for organizations utilizing digital business tools. Annual or quarterly risk assessments, manual compliance checklists and configuration management databases (CMDBs) are not capable of adequately addressing the needs of a fast-moving enterprise. Operational models such as, for example, agile software development and DevOps, the increasing ecosystem of external service providers, supply chain complexities and the overall explosion of elements in any organization's risk management framework due to digital transformation require reevaluation and retooling of risk oriented functions (e.g., security, compliance, legal and audit). Conventional risk management functionality is not equipped to handle the increases in data, threats, vulnerabilities, systems and identities resulting from the continuously evolving technology-based marketplace.

The growth of risk, especially in digital business, has greatly increased. Current techniques for managing risk rely on unsustainable assortments of systems and manual processes. With this increased risk growth, more sustainable, reliable, and accurate mechanisms to address risk are needed.

SUMMARY

In one embodiment, an apparatus comprises at least one processing platform including a plurality of processing devices. The processing platform is configured to receive usage data from a first operational management system, the first operational management system utilizing a plurality of assets of an information technology infrastructure, and to identify, based at least in part on the received usage data, one or more asset relationships between at least two assets of the plurality of assets, and one or more user-asset relationships between one or more users and one or more of the plurality of assets. The processing platform is further configured to apply one or more parameters of a plurality of parameters to the identified asset and user-asset relationships to determine one or more designations associated with the identified asset and user-asset relationships, and to transmit the one or more designations to a second operational management system to trigger a risk management workflow based at least in part on the one or more designations.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Amazon Web Services® (AWS), Google Compute Engine® (GCE), and Microsoft Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

Risk management includes processes for identification, analysis and responding to risks that might adversely impact the objectives of an enterprise. For example, a risk management workflow may include, but is not necessarily limited to, responding to a security alert. According to one or more embodiments, risk management processes are driven by an enterprise context platform. Enterprise context refers to the relationship of any risk management framework element, such as, for example, a system, an asset, a user, an incident, a control and/or a risk to the enterprise.

Figure 1:
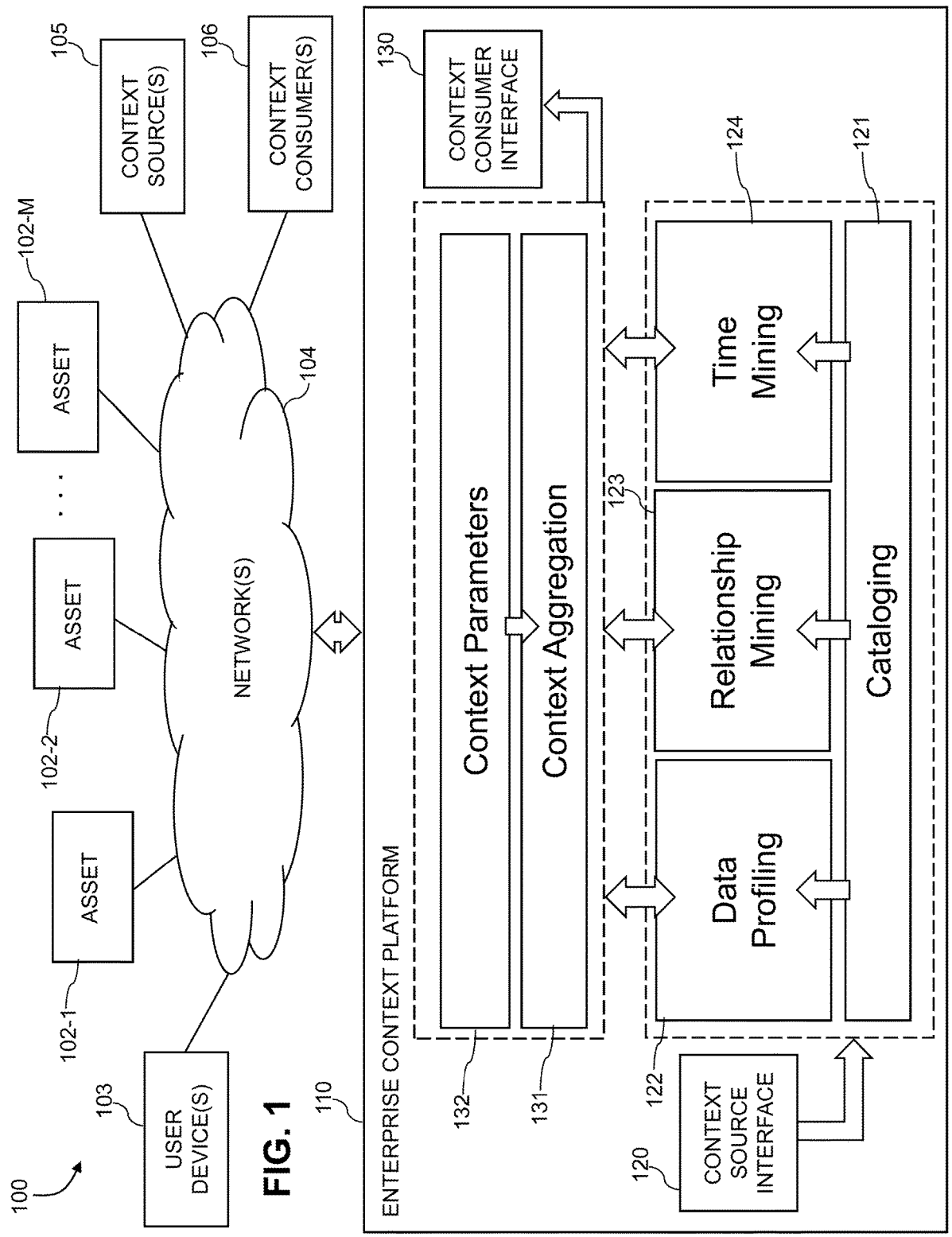
FIG. 1 is a block diagram of an information processing system comprising an enterprise context platform configured for mining enterprise context data in an illustrative embodiment.

FIG. 1 shows an information processing system 100 configured in accordance with an illustrative embodiment. The information processing system 100 comprises assets 102-1, 102-2, . . . 102-M (collectively "assets 102"), one or more user devices 103, one or more context sources 105 and one or more context consumers 106. The assets 102, user devices 103, context sources 105 and context consumers 106 communicate over a network 104 with an enterprise context platform 110. The variable M and other similar index variables herein such as K and L are assumed to be arbitrary positive integers greater than or equal to two.

The assets 102 may include, by way of example, physical and virtual computing resources or systems in an information technology (IT) infrastructure, or applications running on the physical and/or virtual computing resources. Physical computing resources may include physical hardware such as servers, storage systems, networking equipment, Internet of Things (IoT) devices, other types of processing and computing devices, etc. Virtual computing resources may include virtual machines (VMs), containers, etc.

The assets 102 in some embodiments comprise respective physical and/or virtualized computing resources associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The assets 102 may be associated with an enterprise system. The enterprise system may comprise an IT infrastructure of an enterprise, including but not limited to physical infrastructure such as a data center, combinations of physical and virtual infrastructure such as a software-defined data center, a cloud computing infrastructure, etc.

The user devices 103 can comprise, for example, physical computing devices capable of communicating with the enterprise context platform 110 over the network 104. Examples of physical computing devices include IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The user devices 103 may also or alternatively comprise virtualized computing resources, such as VMs, containers, etc.

The term "client" or "user" herein is intended to be broadly construed so as to encompass numerous arrangements of human, hardware, software or firmware entities, as well as combinations of such entities. Enterprise context services may be provided for users utilizing one or more machine learning models, although it is to be appreciated that other types of infrastructure arrangements could be used. At least a portion of the available services and functionalities provided by the enterprise context platform 110 in some embodiments may be provided under Function-as-a-Service ("FaaS") and/or Platform-as-a-Service ("PaaS") models, including cloud-based FaaS and PaaS environments.

The context sources 105 and/or context consumers 106 may each be part of or comprise an operational management system that monitors an enterprise system comprising the plurality of assets 102. In some embodiments, the operational management system comprises a threat detection and remediation system that monitors and/or manages operations in one or more enterprise systems for security threats. Non-limiting examples the operational management system include the RSA NetWitness® (RNW) system, RSA SecurID® system and RSA Archer® system, each available from Dell EMC, all of which may be suitably modified to provide the functionalities described herein. The context sources 105 and/or context consumers 106 may also or alternatively comprise a log concentrator that is configured to obtain network traffic and message logs from assets 102 and/or user devices 103. The context sources 105 and/or context consumers 106 may also or alternatively be part of a critical incident response center (CIRC), a security analytics system, a security information and event management (STEM) system, a Governance, Risk and Compliance (GRC) system, etc. According to an embodiment, a context source 105 and a context consumer 106 may be part of or comprise the same system. Alternatively, the context source 105 and context consumer 106 may be part of or comprise different systems.

In some embodiments, the context sources 105 and/or context consumers 106 generate alerts and notifications that are provided over network 104 to user devices 103, or to a system administrator, IT manager, or other authorized personnel via one or more security or host agents. Such security or host agents may be implemented via computing or processing devices associated with a system administrator, IT manager or other authorized personnel. Such devices can illustratively comprise mobile telephones, laptop computers, tablet computers, desktop computers, or other types of computers or processing devices configured for communication over network 104 with the context source 105 and/or context consumer 106. For example, a given security or host agent may comprise a mobile telephone equipped with a mobile application configured to receive alerts from the context source 105 and context consumer 106, and to provide an interface for the security agent to select particular remedial measures for responding to the alert or notification. Examples of such remedial measures may include blocking access by one or more user devices 103 to an enterprise system (e.g., to one or more of the assets 102 in the enterprise system), requiring user input or authentication by the user devices 103 to obtain information from or otherwise utilize one or more assets 102 of the enterprise system, triggering further review of the enterprise system or assets 102 thereof, etc.

It should be noted that a "security agent" or "host agent" as these terms are generally used herein may comprise an automated entity, such as a software entity running on a processing device. Accordingly, a security agent or host agent need not be a human entity.

The context source(s) 105 and the context consumer(s) 106 in the FIG. 1 embodiment are assumed to be implemented using at least one processing device. Each such processing device generally comprises at least one processor and an associated memory, and implements one or more functional modules for controlling certain features of the context source(s) 105 and the context consumer(s) 106.

The assets 102, user device(s) 103, context source(s) 105, the context consumer(s) 106 and the enterprise context platform 110 in the present embodiment are accessible to each other over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The enterprise context platform 110 in the embodiment of FIG. 1 illustratively comprises a context source interface 120 and a context consumer interface 130. The context source interface 120 interfaces with one or more context sources 105 and provides data from the one or more context sources 105 to an asset cataloging engine 121, a data profiling engine 122, a relationship mining engine 123 and/or a time mining engine 124. Processed data from the engines 121-124 is provided to the context aggregation engine 131, which applies one or more context parameters 132 of a plurality of parameters to the processed data to determine one or more designations. The one or more designations are transmitted to one or more context consumers 106 via the context consumer interface 130 to trigger a risk management workflow based at least in part on the one or more designations. According to an embodiment, the one or more designations comprise a characterization of one or more risks associated with one or more identified relationships between assets 102 and/or between one more users (via user device(s) 103) and one or more assets 102.

In more detail, the enterprise context platform 110 performs enterprise context data mining of usage data received from one or more context sources 105. As noted above, enterprise context refers to the relationship of any risk management framework element, such as, for example, a system, an asset, a user, an incident, a control and/or a risk to the enterprise. Enterprise context data mining refers to automated processing to determine enterprise context based on asset and user activity. The enterprise context platform utilizes output (e.g., usage data) that is a byproduct of an operational management system (e.g., context source(s) 105). In other words, identifying enterprise context is not the main function of the context source(s) 105.

For example, the usage data comprises network traffic output from network management and/or monitoring tools to determine asset to asset communications thus identifying assets 102, such as, for example, systems, devices or other resources in an IT infrastructure, and identifying relationships between assets. In another example, the usage data comprises user communications data output from asset logs, such as, for example, system and application logs, which is used by the enterprise context platform 110 to determine relationships between enterprise users (via user devices 103) and assets 102. Users may be associated with functional groups or departments, such as, for example, human resources, finance, sales, operations, engineering, legal, etc. The functional group data is also obtained from the context source(s) 105. The enterprise context platform 110 combines the functional group data with the user to asset communication data to determine one or more relationships between functional groups and assets 102. Usage data may also comprise metadata corresponding to communications between assets of one or more asset relationships. The metadata may include, but is not limited to, timestamps, sources and destinations of messages.

The enterprise context platform 110 provides and receives data to and from a variety of computing resources including the context sources and consumers 105 and 106, as well as the assets 102 and user device(s) 103 managed and/or monitored by the context sources and consumers 105 and 106. The context source and the context consumer interfaces 120 and 130 are configured to support multiple data formats and data transport protocols in order to be able to interface with different operational management systems using heterogeneous data formats and/or transport protocols. Based on different configurations, relevant data from the context sources and consumers 105 and 106, the assets 102 and user device(s) 103 for analysis in the enterprise context platform 110 can be pushed to or pulled by the enterprise context platform 110.

For example, in one or more embodiments, the enterprise context platform 110 defines an input format similar to a Syslog format. In a non-limiting example, the context source interface 120 queries a context source(s) 105 for the following information as set forth in Tables 1 and 2, for asset to asset communications and user to asset communications, respectively.

TABLE 1

Asset to Asset

| Time Stamp | Source Host | Destination Host | Type of Communication (e.g. port, application, etc.) |
| --- | --- | --- | --- |

TABLE 2

User to Asset

| Time Stamp | User/Identity | Destination Host | Type of Communication (e.g. port, application, etc.) |
| --- | --- | --- | --- |

The cataloging engine 121 generates and/or maintains one or more asset inventories associating a plurality of assets 102 with one or more asset types. For example, assets 102 that may be used in connection with an operational management system (e.g., a context source 105 or context consumer 106) include, but are not necessarily limited to, vulnerability scanners and data center management tools, which are cataloged in the enterprise context platform 110. In addition, the cataloging engine 121 catalogs user identities.

According to an embodiment, the catalogs or portions thereof may be pulled from outside sources, such as, for example, from human resource systems and/or finance systems, and include, for example, organizational hierarchy and legal entity information. According to one or more embodiments, the cataloging engine 121 uses the Lightweight Directory Access Protocol ("LDAP") for accessing and maintaining distributed directory information services to permit sharing of information about users and assets 102, such as systems, networks, services and applications. Asset catalogs generated and/or maintained by the cataloging engine 121 include a flexible hierarchy of assets to account for the various elements of enterprise context (e.g., IT assets and enterprise assets). The cataloging engine 121 is also configured to consolidate asset profiles where applicable, such as in the case of multi-homed systems, virtual systems, etc. The cataloging engine 121 is further configured to address catalog and/or maintain catalogs of assets from highly volatile environments, such as, for example, environments using the Dynamic Host Configuration Protocol (DHCP), where DHCP servers dynamically assign Internet Protocol (IP) addresses and other network configuration parameters to assets on a network to permit the assets to communicate with different IP networks.

The cataloging engine 121 uses data collected by the context source(s) 105 that indicates a physical or logical device to populate an asset catalog. For example, any hosts identified through network/packet activity or as a source/destination within log data by the content source(s) 105 (e.g., RNW) would be added to the asset catalog.

In connection with user identity cataloging, the cataloging engine 121 may utilize centralized identity management systems such as Active Directory as a source for user identity information. Additionally, unknown users discovered via log or packet data (e.g., via Syslog messages), could also be used by the cataloging engine 121 to identify identities.

The data profiling engine 122 determines attributes of data residing on assets 102. Such attributes include, but are not necessarily limited to, data type, number of records, data growth rates, data volatility, etc. The data profiling engine 122 generates flags for assets 102 corresponding to the determined data attributes, which may be used by the context aggregation engine 131 to assign importance and/or levels of risk to different assets 102 based on one or more context parameters 132. In a non-limiting example, if an asset comprises personally identifiable information (PII) or electronic protected health information (ePHI), the asset may be flagged as a compliance risk. In another non-limiting example, the context aggregation engine 131 may receive as a context parameter 132, a rule that if a data growth rate for a given asset exceeds a pre-defined threshold growth rate (e.g., specified increase in percentage of data over a given time period), then the given asset may be deemed important to the enterprise, warranting a higher risk of loss designation than an asset deemed less important to the enterprise.

The relationship mining engine 123 determines relationships between assets 102 based on data received from context source(s) 105. For example, based on data from managing and monitoring of an enterprise system by an operational management system (e.g., context source(s) 105), the relationship mining engine automatically determines and defines relationships between assets 102 and between users (based on user devices 103) and assets 102.

For example, if the enterprise context platform 110 receives data from a context source 105 that a plurality of users access a specific application, the relationship mining engine 123 concludes that there is a relationship between the users and the application (e.g., user-asset relationship). Further, if that application is hosted in a specific location identified through geo-location services, the relationship mining engine 123 concludes that there is a relationship between the virtual environment of the application and physical environment of where the application is hosted. As explained further herein, the context aggregation engine 131, receiving data that the location where the application is hosted is being threatened by a natural disaster (e.g., a hurricane), determines that there is a cascading risk that the users may be adversely affected by loss of use of the application due to damage to the host site by weather conditions. In this non-limiting example, relationships are dynamically learned and conclusions about the volatility of relationship can be determined in real-time based on data from one or more content sources 105 being consumed by the enterprise context platform 110.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

In connection with asset to asset communications, the relationship mining engine 123 concludes that there is a relationship between assets 102 as one asset electronically communicates (e.g., over a network 104) with another asset. In addition, the relationship mining engine 123 analyzes the data from the context source(s) 105 to determine a frequency of the communication between the assets 102, which, as described further herein, is used by the context aggregation engine 131 to determine a relative strength of the relationship. For example, the context aggregation engine 131 may receive as a context parameter 132, a rule that if a frequency of communication/network traffic between assets exceeds a pre-defined threshold frequency (e.g., specified number of communications between the assets over a given time period), then the relationship between assets is deemed to be strong. In an embodiment, the context aggregation engine 131 identifies a need for more risk monitoring of a strong relationship between assets than of a relatively weaker relationship between assets, which may be based, at least in part, on less frequent communication between the assets.

The relationship mining engine 123 also analyzes the data from the context source(s) 105 to determine a volume of communications received by a given asset from other assets, which, as described further herein, is used by the context aggregation engine 131 to determine a relative importance of the receiving asset to the enterprise. For example, the context aggregation engine 131 may receive as a context parameter 132, a rule that if a volume of received communications/network traffic for a given asset exceeds a pre-defined threshold volume (e.g., specified number of received communications from any asset over a given time period), then the receiving asset is deemed to be important and/or crucial to enterprise processes. In this case, the context aggregation engine 131 may conclude a high availability risk, such that a loss of the receiving asset is a high risk to the enterprise.

The relationship mining engine 123 also analyzes the data from the context source(s) 105 to identify the nature of network traffic (e.g. Domain Name System (DNS), Hyper Text Transfer Protocol Secure (HTTPS), etc.), and determine an asset profile. According to one or more embodiments, the enterprise context platform 110 maintains attributes of the assets' usage, such as, for example, relationships, frequency and volume statistics and service/protocol usage. The context aggregation engine 131 would then use these inputs to identify potential risks via the context parameters 132 comprising a plurality of rules.

The relationship mining engine 123 also analyzes the data from the context source(s) 105 to identify details about users accessing specific assets so that the enterprise context platform 110 can determine how assets are used by the enterprise. For example, as noted herein above, users may be associated with functional groups or departments, such as, for example, human resources, finance, sales, operations, engineering, legal, etc. Since enterprises may have existing databases or techniques for identifying functional groups with which a user may be associated (e.g., metadata identifiers, LDAP, an identity management system), the functional group data can be obtained from the context source(s) 105. The relationship mining engine 123 analyzes the data from the context source(s) 105 to determine a number of functional groups accessing a given asset. This information is used by the context aggregation engine 131 to determine whether the asset is an "enterprise asset" being used by multiple functional groups within an enterprise (e.g., asset is used by users associated with human resources, finance, sales, operations, engineering, legal, etc.), or is a "specialized asset," being used by a limited number of functional groups within an enterprise (e.g., asset only used by users associated with sales). For example, the context aggregation engine 131 may receive as a context parameter 132, a rule that if a number of functional groups accessing a given asset exceeds a pre-defined threshold number, then the given asset is deemed to be an enterprise asset. Alternatively, if a number of functional groups accessing a given asset is less than a pre-defined threshold number, then the given asset is deemed to be a specialized asset. In this case, the context aggregation engine 131 may conclude a lower risk tolerance for an enterprise asset, which is used for enterprise-wide processes than for a specialized asset, which is used only by dedicated groups.

Any data collected or generated by a context source(s) 105 that indicates asset to asset communication or user to asset communication may be used by the relationship mining engine 123 to infer a relationship. For example, a firewall used by a context source(s) 105 could provide source and destination information. The context source(s) 105 could also provide source/destination information based on network traffic or system log events.

The time mining engine 124 determines asset and user communication cycle data, which is used to prioritize risks. For example, the context sources 105 may be configured to gather data regarding when assets are receiving or generating relatively high volumes of network traffic. The data can be in terms of pre-defined time periods, such as, for example, time of day, week, month, and/or year to define times of high volume activity. Events captured by context sources 105 may include timestamps associated with the asset and/or user activity. This data would also be used by the time mining engine 124 to identify usage patterns of cataloged assets.

As noted above, the context aggregation engine 131 may receive as a context parameter 132, a rule that if a volume of received communications/network traffic for a given asset exceeds a pre-defined threshold volume (e.g., specified number of received communications from any asset over a given time period), then the receiving asset is deemed to be important and/or crucial to enterprise processes. In addition, based on one or more additional parameters 132, the context aggregation engine 131 may also factor in data on which user groups are communicating with a given asset. In this case, the time mining engine 124 provides data to the context aggregation engine 131 regarding when and with which type of users an asset is receiving or generating high volume traffic. The context aggregation engine 131 uses this information to prioritize risks. In a non-limiting example, based on one or more context parameters 132, the context aggregation engine 131 assigns a higher availability risk at the end of each month to an asset receiving a high volume of traffic from sales team users at the end of each month.

The context parameters 132 comprise the enterprise rules that support the context aggregation function performed by the context aggregation engine 131, and the resulting output to the context consumer(s) 106. The context parameters 132 may be stored in one or more databases. As described herein, examples of context parameters 132 are rules for specific thresholds for risk characterizations or to determine specific contextual relationships. In addition to the examples previously described, some non-limiting examples of context parameters 132 include, but are not limited to: (i) if an asset is in the top 10% of utilized assets among a plurality of assets 102, the asset is flagged as "high availability risk" (e.g., loss of availability of the asset would be problematic for the enterprise); (ii) if an asset of the plurality of assets 102 is accessed by a functional group comprising executives and/or officers within an enterprise, the asset is flagged as a "high confidentiality risk;" (iii) if there are a number of users accessing an asset above a specified threshold number of users, the asset is flagged as a "high user risk" (e.g., loss of the asset would be problematic for users of an IT infrastructure of an enterprise); and (iv) if an asset is used by a specific LDAP group, a relationship to an enterprise function is concluded.

The context parameters 132 define thresholds and rules used in by context aggregation engine 131 and are used to apply consistent handling of the data processed and analyzed by the engines 121-124. According to illustrative embodiments, the context parameters 132 are pre-defined and inputted to the enterprise context platform 110 by one or more administrative users. Alternatively, the context parameters can be generated using a machine learning model (e.g., linear regression, neural network, Support Vector Machine (SVM), Multilayer Perceptron (MLP), a deep learning model, decision trees and/or clustering) based on collected training sets. The training sets include, for example, user feedback about the context parameters 132. In one or more embodiments, the enterprise context platform 110 redefines context parameters 132, and periodically retrains context parameter models based on collected users' inputs regarding the context parameters 132.

The context aggregation engine 131 applies the context parameters 132 to the data from the engines 121-124 to generate outputs comprising, for example, identified relationships between assets and between users and assets, and characterizations of risks associated with the identified relationships. The context aggregation engine 131 aggregates the mined enterprise context data and applies the context parameters 132 to the data to produce the output for the context consumers 106.

According to one or more embodiments, based on the output from the content aggregation engine 131 received via the context consumer interface 130, the context consumer(s) 106 uses the determined risks and relationships to affect a wide variety of use cases. In a non-limiting example, the context consumer(s) 106 prioritizes security incidents (e.g., based on the time of occurrence of an incident). For example, an asset determined to be widely used during a particular time (e.g., based on predefined thresholds to conclude wide use) would be given higher security priority if the incident occurs during the particular time. In another example, the context consumer(s) 106 flags assets under different risks (e.g., high availability risk (based on volume of network traffic) and/or high confidentiality/integrity risk (based on data resident on the asset)). The context consumers 106 may also develop and/or modify risk management planning based on the enterprise context data received from the enterprise context platform 110. For example, assets 102 determined to be relatively high volume assets would be subject to more stringent business continuity (BC)/disaster recovery (DR) testing cycles, and audit plans would target data assets determined to be sensitive according to one or more context parameters 132. The context consumer(s) 106 may be configured to have an alert mechanism based on input from the enterprise context platform 110 including a risk designation for an asset that is not already part of a DR plan. In this case, the context consumer(s) 106 may issue the alert to an administrative user device, or automatically modify a DR plan to include the at-risk asset.

According to one or more embodiments, the enterprise context platform 110 is configured to receive queries from, for example, context sources and consumers 105 and 106, and from other systems, inquiring about the context of one or more assets. The output of the enterprise context platform 110 is used to tune the core functions of the inquiring system. For example, RNW (e.g., context source 105), through monitoring network activity, sends metadata on asset to asset communications (e.g., timestamps, message sources, message destinations, etc.) to the enterprise context platform 110. The enterprise context platform 110, through one or more context parameters 132, identifies an asset (e.g., destination host) with a high volume of usage and places a flag of "high traffic" on the asset. If the asset with the high traffic flag falls into the top 10% of high traffic assets based on the application of another context parameter 132, the asset is further flagged as an asset having a critical availability risk ("Availability Risk—Critical").

In a non-limiting example, a DR planning tool, such as RSA Archer® (e.g., context consumer 106), may query the enterprise context platform 110 on the availability impact of an asset. After receiving a "high traffic" flag for the asset from the enterprise context platform 110, the DR planning tool identifies an alteration of the management of that asset, e.g. DR plans tested more frequently or data center monitoring is increased. Upon receiving designations of "Availability Risk—Critical" for certain assets, a DR planning tool may execute a risk management workflow to ensure proper inclusion in DR planning, testing and monitoring for those assets.

As noted above, context sources and context consumers 105 and 106 may be the same system, with the source data for the enterprise context platform 110 being a byproduct of the system, and the consumed data received from the enterprise context platform 110 feeding into a core function of the system. For example, RNW may provide asset activity as a source (byproduct of monitoring systems) and consume context data to prioritize alerts (core function).

As can be understood, the enterprise context platform 110 performs enterprise context data mining to affect risk management processes performed by one or more context consumers 106. Network, system and logging technologies of a context source 105 are used to report on the usage of assets in an enterprise IT infrastructure. For example, a core function of RNW (or other context source 105) is to provide security monitoring and network forensic capabilities. However, a byproduct of this deep monitoring is the ability to record the usage of assets. These observations can inform risk management processes outside of RNW's core functions.

For example, the more an asset is used, the more likely availability of that asset is a risk. Based on usage data received from RNW (or other context source 105), the enterprise context platform 110 determines high usage of an asset and can link the high usage to certain time periods of the high activity. The enterprise context platform 110 may conclude that the asset has specific periods of higher and lower availability risk. Automatically feeding these determinations and conclusions of the enterprise context platform 110 to a context consumer 106 (e.g., RSA Archer®) triggers risk management workflows. The specific transaction/usage data received from the context source (e.g., RNW) is not provided to the context consumer.

If an asset is flagged as a high usage asset with high availability requirements, the risk management workflow may include, for example, making the asset part of a DR plan, or modifying/updating a DR plan including the asset. The risk management workflow may also include reviewing and/or testing a DR plan, and/or scheduling reviewing and/or testing of the DR plan. The risk management workflow may also include using determinations and conclusions of the enterprise context platform 110 to automatically determine recovery time objective (RTO) for various assets 102 and enterprise processes.

The enterprise context platform 110 is configured to provide data to the context consumer(s) 106 regarding the relationship between enterprise functions and enterprise assets utilizing users and groups from context source(s) 105 (e.g., RSA SecurID®). As user groups represent different enterprise units, (e.g. sales, HR, IT administrators, etc.), the context of the assets could be identified by the enterprise context platform 110. The data regarding the relationship between enterprise functions and enterprise assets may be used by the context consumers 106 to determine relative importance of users and their associated risk, as well as potential conflicts of interest.

According to one or more embodiments, the enterprise context platform 110 provides a context consumer(s) 106 with automated inputs for risk quantification. Risk quantification may be based on a point-in-time analysis, e.g. the Factor Analysis of Information Risk (FAIR) methodology. The FAIR methodology requires inputs that are generally provided as a point in time (e.g., number of records in the asset, the nature of the asset, etc. at a point in time), which feeds a quantification engine to determine value-at-risk. However, the asset's value-at-risk could fluctuate as an enterprise system changes. For example, an asset (e.g., application) with 1,000 customer records, results in a value-at-risk=$Y. However, the next month due to hyper growth, that same asset has 20,000 customer records and thus a different value-at-risk. The enterprise context platform 110 providing a context consumer(s) 106 with automated inputs for risk quantification automates the value-at-risk calculation, thus making the evaluation more accurate and based on real-time records.

The enterprise context platform 110 overlays other automated systems (e.g., context sources 105), to make determinations about assets, relationships and data as a byproduct of the core functions of the other automated systems. The enterprise context platform 110 focuses on the attributes of the assets and users necessary for risk analysis. For example, the context source(s) 105 collect, parse and aggregate raw data from enterprise systems. Then, the enterprise context platform 110 performs selective data integration to pull data to catalog and apply the context parameters 132.

In processing data from the context source(s) 105, the enterprise context platform 110 parses data provided from the context source(s) 105, populates asset and user identity catalogs and determines relationships between assets 102 and between users and assets 102. A context source(s) 105 is configured to collect data from endpoints. Endpoints refer to applications, devices or other assets that create system activity data.

For example, a context source 105, such as, but not necessarily limited to RNW, gathers logs and packet information, and parses and processes the data for identification of potential security threats. For example, a context source 105 parses Syslog data from different system logs for analysis. The enterprise context platform 110 pulls limited data from the context source 105 to determine context.

Depending on the nature of the data provided by the context source 105, the enterprise context platform 110 determines what portion of enterprise context would be inferred.

The enterprise context platform 110 in some embodiments may be implemented as part of a cloud infrastructure in the form of a cloud-based system such as an AWS system. Other examples of cloud-based systems that can be used to provide at least portions of the enterprise context platform 110 and possibly other portions of system 100 include GCE, and Microsoft Azure®.

The context source and context consumer interfaces 120 and 130, the cataloging engine 121, the data profiling engine 122, the relationship mining engine 123, the time mining engine 124, the context aggregation engine 131, the context parameters 132 and other components of the enterprise context platform 110 comprise further hardware and software required for running the enterprise context platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

The databases or cloud environments discussed herein (e.g., database for storing the context parameters 132) may comprise a database service, such as, but not necessarily limited to GCE Cloud Storage, Microsoft Azure Blob (Binary Large Object) Storage, DynamoDB, MongoDB, Amazon Aurora and Oracle database.

The enterprise context data mining services performed by the enterprise context platform 110 can be performed based on real-time updates, modifications and/or additions to the assets 102, user device(s) 103, context source(s) 105 and/or context consumer(s) 106 so that the information processing system can react to events as they happen.

Although the context source and context consumer interfaces 120 and 130, the cataloging engine 121, the data profiling engine 122, the relationship mining engine 123, the time mining engine 124, the context aggregation engine 131, the context parameters 132 and other components of the enterprise context platform 110 in the present embodiment are shown as part of the enterprise context platform 110, at least a portion of the context source and context consumer interfaces 120 and 130, the cataloging engine 121, the data profiling engine 122, the relationship mining engine 123, the time mining engine 124, the context aggregation engine 131, the context parameters 132 and other components of the enterprise context platform 110 in other embodiments may be implemented on one or more other processing platforms that are accessible to the enterprise context platform 110 over one or more networks. Such components can each be implemented at least in part within another system element or at least in part utilizing one or more stand-alone components coupled to the network 104.

The databases described herein are assumed to comprise one or more storage systems configured to store information relating to processing performed, data used, and to other functionality of the enterprise context platform 110. Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of enterprise context platform 110 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO®, and scale-out NAS clusters comprising Isilon® platform nodes and associated accelerators, all from Dell EMC. Combinations of multiple ones of these and other storage products can also be used in implementing a given storage system in an illustrative embodiment.

It is assumed that the enterprise context platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, context source and context consumer interfaces 120 and 130, the cataloging engine 121, the data profiling engine 122, the relationship mining engine 123, the time mining engine 124, the context aggregation engine 131, the context parameters 132 and other components of the enterprise context platform 110, and the elements thereof can each be implemented in the form of one or more LXCs running on one or more VMs. Other arrangements of one or more processing devices of a processing platform can be used to implement context source and context consumer interfaces 120 and 130, the cataloging engine 121, the data profiling engine 122, the relationship mining engine 123, the time mining engine 124, the context aggregation engine 131 and the context parameters 132, as well as other components of the enterprise context platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the enterprise context platform 110 to reside in different data centers. Numerous other distributed implementations of the enterprise context platform 110 are possible.

Accordingly, one or each of the context source and context consumer interfaces 120 and 130, the cataloging engine 121, the data profiling engine 122, the relationship mining engine 123, the time mining engine 124, the context aggregation engine 131, the context parameters 132 and other components of the enterprise context platform 110 can each be implemented in a distributed manner so as to comprise a plurality of distributed components implemented on respective ones of a plurality of compute nodes of the enterprise context platform 110.

It is to be appreciated that these and other features of illustrative embodiments are presented by way of example only, and should not be construed as limiting in any way.

Accordingly, different numbers, types and arrangements of system components such as the context source and context consumer interfaces 120 and 130, the cataloging engine 121, the data profiling engine 122, the relationship mining engine 123, the time mining engine 124, the context aggregation engine 131, the context parameters 132 and other components of the enterprise context platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the enterprise context platform can be offered to cloud infrastructure customers or other users as part of FaaS and/or PaaS offerings.

Figure 2:
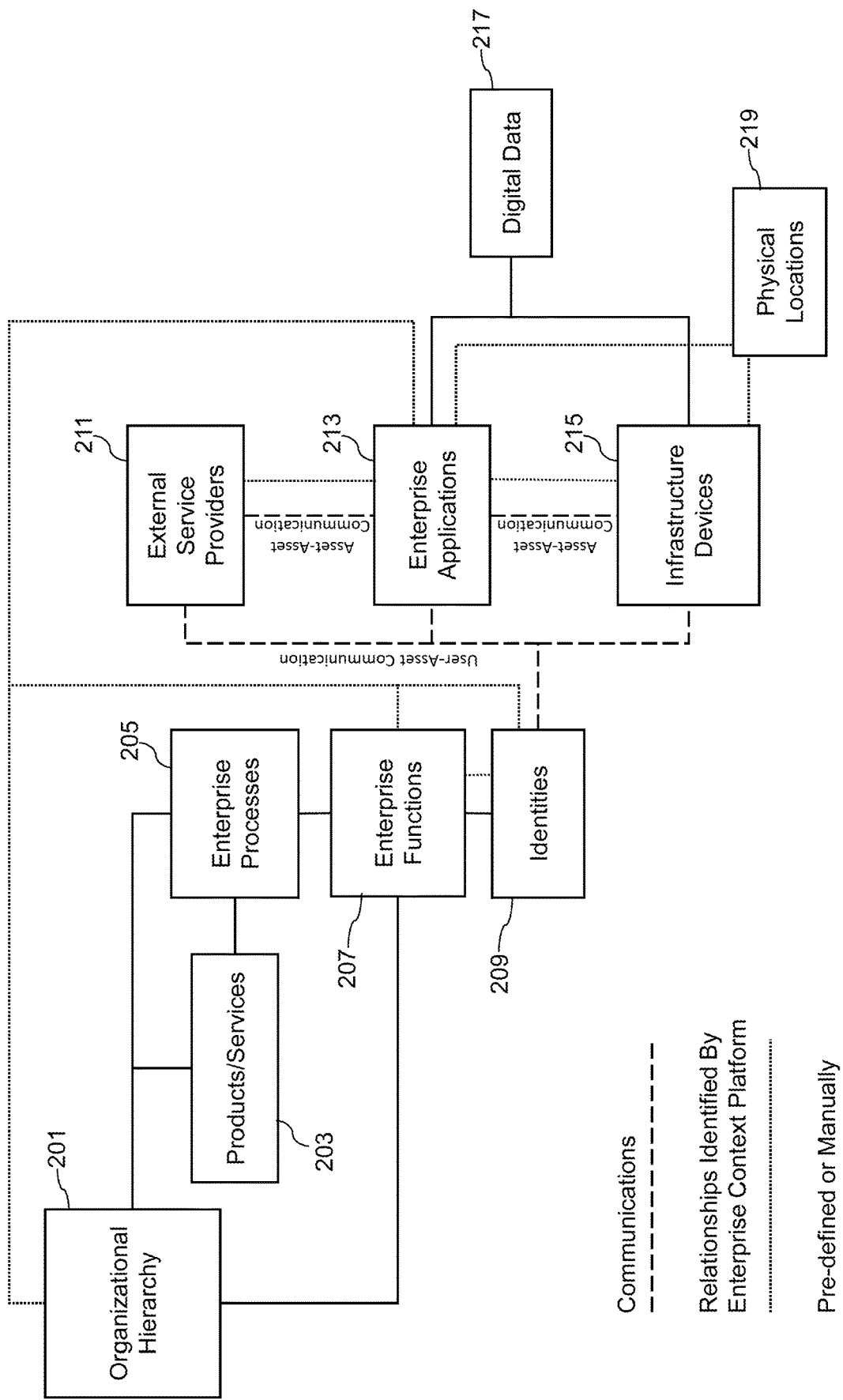
FIG. 2 is a block diagram illustrating relationships and communications between data and assets of an enterprise and an IT infrastructure in an illustrative embodiment.

FIG. 2 is a diagram illustrating relationships and communications between data and assets of an enterprise and an IT infrastructure in an illustrative embodiment. Referring to FIG. 2, data of an enterprise may fall under different pre-defined categories associated with a particular enterprise, such as, for example, organizational hierarchy 201, products/services 203, enterprise processes 205, enterprise functions 207 and identities 209. The organizational hierarchy 201 may include, for example, in descending order, company, division, department and functional group. The products/services 203 may be defined as, for example, customer facing (external) or internal products/services. The enterprise processes 205 may include, for example, customer on-boarding, inbound logistics and application development. The enterprise functions 207 may include, for example, HR, sales, manufacturing, and IT. The identities 209 include, for example, users and members of the enterprise. As shown by the solid connector lines in FIG. 2, there are pre-defined or manually created relationships between the different categories 201, 203, 205, 207 and 209. These relationships and categories may be discoverable by the enterprise context platform 110 through, for example, identity management systems (e.g., LDAP), centralized systems, catalogs in context sources 105 and other electronic enterprise catalogs. In the case of a manually created relationship, a user may manually create a relationship, for example, between a product/service 203 and an enterprise process 205, and input that relationship to the enterprise context platform 110.

In addition, as shown by the dotted connector lines in FIG. 2, the enterprise context platform 110 automatically identifies relationships between categorized elements of an enterprise using one or more techniques described herein associated, at least in part, with the relationship mining engine 123. For example, based on categorical data received from context sources 105, the enterprise context platform 110 may infer relationships between functional groups (part of organizational hierarchy 201), users (identities 209) and/or enterprise functions 207.

FIG. 2 also includes enterprise or IT infrastructure assets such as, for example, external service providers 211, enterprise applications 213 and infrastructure devices 215. The external service providers 211 may include, for example, cloud-based systems such as AWS, GCE and Microsoft Azure®, project management tools, such as SFDC (Salesforce.com® (Salesforce.com Inc., San Francisco, Calif.)), and database management systems, such as database servers for storing and retrieving data as requested by applications (e.g., SAP® database (SAP America Inc., Newtown Square, Pa.) and Oracle® database (Oracle Corporation, Redwood City, Calif.)). The enterprise applications 213 may include, for example, (i) platforms for business process automation, which enable communication between different software systems used in an enterprise (e.g., Microsoft® BizTalk®); (ii) platforms to provide programming language interoperability (e.g., Microsoft® .NET framework); (iii) platforms to provide support for web applications through, for example, servlets, struts or Java® Server Pages (JSPs) (e.g., Java® applications); and (iv) platforms for programming using certain programming languages (e.g., C, C++) to create, for example, computer applications, firmware, verification software, test code and/or simulators for various applications and hardware products. The infrastructure devices 215 may include, for example, servers, printers, endpoints, and networking devices.

As shown by the dashed-lines in FIG. 2 and discussed in detail herein, based on data received from the context sources 105, the enterprise context platform 110 identifies asset-asset communication between assets, such as, for example, between assets 211, 213 and/or 215, and user-asset communications between users (e.g., identities 209) and assets 211, 213 and/or 215. In addition, as shown by the dotted lines in FIG. 2 and discussed in detail herein, the enterprise context platform 110 determines relationships between the users and assets 211, 213 and/or 215 and between assets 211, 213 and 215. Further, the enterprise context platform 110 also infers a relationship between one or more infrastructure devices 215 and/or one or more enterprise applications 213 and physical locations 219. For example, an infrastructure device or an enterprise application may be in or hosted in a specific location identified through geolocation services. The enterprise context platform 110 may identify relationships between virtual and physical environments, and can assess risk to a corresponding asset if one of the physical locations 219 where the asset is located or hosted is threatened by one or more factors (e.g., weather, natural disaster).

One or more of the assets 211, 213 or 215 may include certain types of digital data 217 which would cause the enterprise context platform 110 to conclude a risk. For example, referring to FIG. 2, an enterprise application 213 and/or infrastructure device 215 may use or include digital data 217 of a sensitive nature such as, for example, PII, ePHI and/or financial information. In this case, upon receipt of data from context source indicating a relationship between these assets 213 and/or 215 and the sensitive digital data, the enterprise context platform 110 characterizes a risk based on the data.

Figure 3:
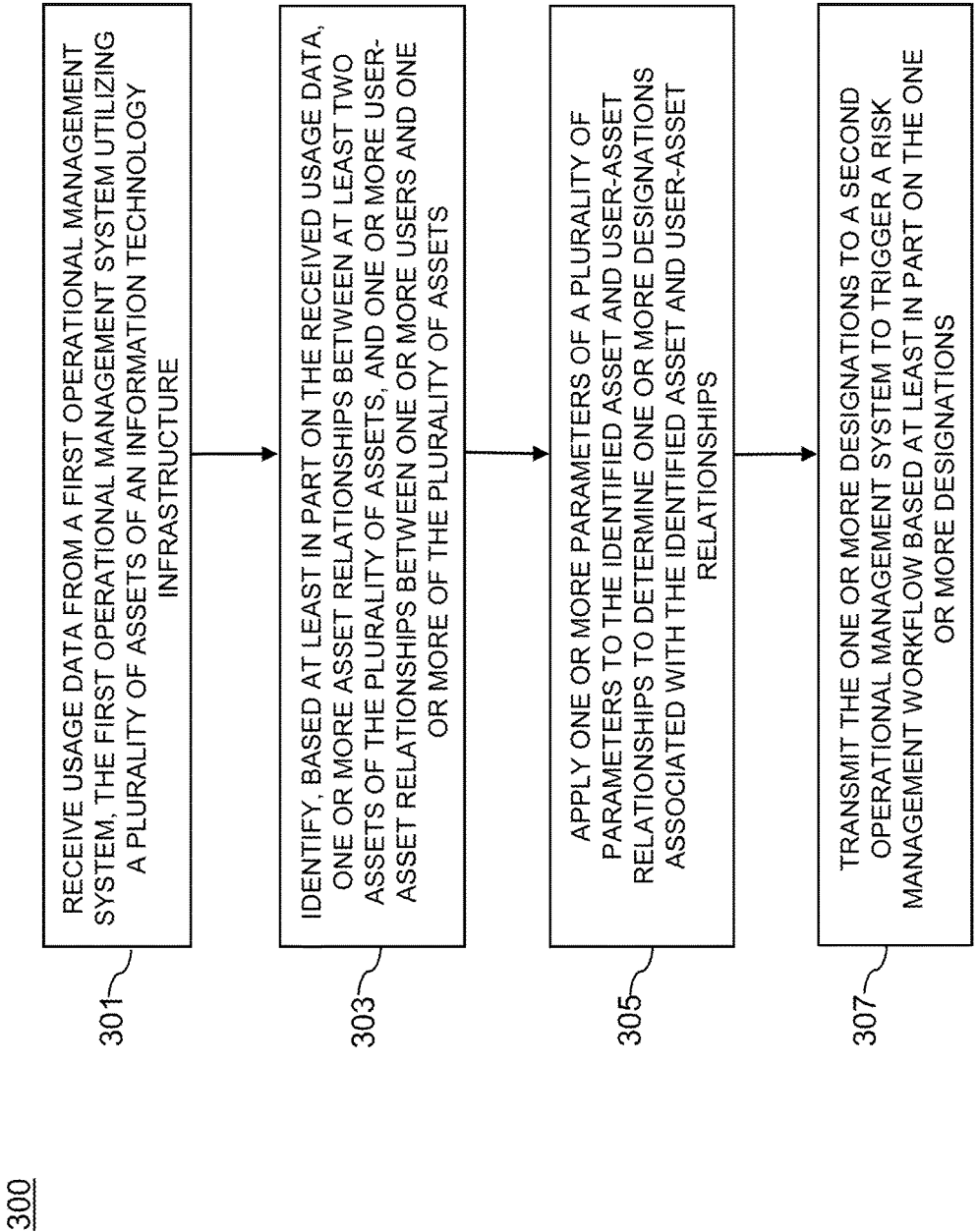
FIG. 3 is a flow diagram of a process for mining enterprise context data in an illustrative embodiment.

The operation of the information processing system 100 will now be described in further detail with reference to the flow diagram of FIG. 3. With reference to FIG. 3, a process 300 for enterprise context retrieval as shown includes steps 301 through 307, and is suitable for use in the system 100 but is more generally applicable to other types of information processing systems comprising an enterprise context platform configured for use in enterprise context data mining.

In step 301, usage data is received from a first operational management system, such as, for example, a context source 105. The first operational management system utilizes a plurality of assets of an information technology infrastructure.

Referring to step 303, based at least in part on the received usage data, one or more asset relationships between at least two assets of the plurality of assets, and one or more user-asset relationships between one or more users and one or more of the plurality of assets are identified. As described in detail herein, the enterprise context platform 110 receives the usage data from a context source(s) 105, and identifies asset and asset-user relationships based on the data that is received. According to one or more embodiments, the usage data comprises network traffic data, identification data for the plurality of assets, asset communication log data and/or metadata corresponding to communications between the at least two assets associated with the identified one or more asset relationships.

In step 305, one or more parameters of a plurality of parameters (e.g., context parameters 132) are applied to the identified asset and user-asset relationships to determine one or more designations associated with the identified asset and user-asset relationships. For example, the context aggregation engine 131 applies context parameters to the identified asset and user-asset relationships from, for example, the relationship mining engine 123 to determine, for example, a characterization of one or more risks associated with the identified asset and user-asset relationships. In step 307, the one or more designations are transmitted to a second operational management system to trigger a risk management workflow based at least in part on the one or more designations. According to an embodiment, the second operational management system is a context consumer 106. The risk management workflow may comprise prioritizing risk management based at least in part on time and/or location associated with use of a given asset of the plurality of assets.

Applying the one or more parameters may include identifying a category of users associated with a given user-asset relationship, such as, for example, a functional group of users. Applying the one or more parameters may also include identifying one or more periods of relatively high communication volume between entities of a given asset relationship, and between entities of a given user-asset relationship. The one or more periods of relatively high communication volume are relative to other periods of relatively low communication volume, and can be determined according to thresholds provided in the context parameters 132.

According to one or more embodiments, applying the one or more parameters includes determining whether a given asset of the plurality of assets comprises PII or ePHI, and/or comparing a number of users accessing a given asset of the plurality of assets with a threshold to determine whether a relatively high number of users are accessing the given asset. In some embodiments, the one or more parameters comprise an asset utilization threshold to determine whether an asset is being highly utilized. For example, an asset may be deemed highly utilized if, over a given time period, the number of times the asset is being used by users and/or other assets is greater than the use of a specified percentage of the remaining assets).

The process 300 may also include determining a frequency of communication between entities of a given asset relationship, and between entities of a given user-asset relationship to determine, for example, relative importance and/or criticality of certain relationships. In addition, locations where the plurality of assets are being hosted are identified to determine, for example, hosting locations that may be at risk due to, for example, external conditions (e.g., weather, natural disasters).

According to one or more embodiments, the enterprise context platform 110 determines whether a given user-asset relationship comprises an enterprise relationship or a dedicated function relationship based at least in part on at least one of a number of users associated with the given user-asset relationship and a category of users associated with the given user-asset relationship. For example, if a number of users and/or functional groups accessing a given asset exceeds a pre-defined threshold number, then the given asset is deemed to be an enterprise asset. Alternatively, if a number of users and/or functional groups accessing a given asset is less than a pre-defined threshold number, then the given asset is deemed to be a specialized asset. In this case, the context aggregation engine 131 may conclude a lower risk tolerance for an enterprise asset, which is used for enterprise-wide processes than for a specialized asset, which is used only by dedicated groups.

The process 300 may also include maintaining a catalog associating the plurality of assets with one or more asset types. In addition, a type of data, a volume of the data and/or a growth rate of the data associated with a given asset of the plurality of assets may be determined by the enterprise context platform 110.

It is to be appreciated that the FIG. 3 process and other features and functionality described above can be adapted for use with other types of information systems configured to execute enterprise context data mining on an enterprise context platform or other type of processing platform.

The particular processing operations and other system functionality described in conjunction with the flow diagram of FIG. 3 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Unlike current risk management systems, the illustrative embodiments of systems with the enterprise context platform as disclosed herein advantageously use enterprise context information to generate risk management workflows in complex digital IT infrastructures. For example, prioritizing security or operational events is an area where the challenge of understanding enterprise context impact surfaces, and this challenge extends beyond tactical prioritization of issues or incidents. Compliance and audit functions, for example, are confronted with exceedingly complicated enterprise processes built on sprawling IT infrastructures, making identifying scopes of compliance requirements or audits extremely difficult. In addition, supply chain management and resiliency planning has become convoluted with a mixture of internal and external components. The digital world requires enterprise contextual information in order to make informed risk management decisions.

By identifying relationships between assets, users and enterprise functions, the embodiments establish connections between digital events and enterprise impact of the digital events. The sheer magnitude of digital events and the dynamic nature of technical infrastructures, identities and systems obviate the need for automated techniques to discover IT assets and the enterprise context around those assets. Further, the impact of the IoT and operational technologies (OT) increases the volatility and velocity of digital transformation in an IT infrastructure of an enterprise.

Conventional approaches to enterprise risk management waste computational resources by relying on inefficient mixtures of automated systems and manual processes. For example, while aspects of IT asset inventories may be automated by scanning technologies or data center management tools, there are no current mechanisms to account for the identities of users from multiple locations, relationships between assets, relationships between users and assets and asset criticality. The mining of the enterprise context data in accordance with the embodiments advantageously generates critical determinations regarding what digital assets are utilized in an enterprise and how those assets utilized by the enterprise. When combined, these determinations provide insight into the criticality of the assets, which is then used to prioritize risk and security issues, controls, incidents, etc. In order to implement risk management workflows, the embodiments advantageously catalog an enterprise's IT infrastructure, including asset attributes and user identities, identify relationships between assets and between users and assets, and generate risk characterizations based on the catalogs and identified relationships.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the enterprise context platform 110 or portions thereof are illustratively implemented for use by tenants of such a multi-tenant environment.

As mentioned previously, cloud infrastructure as disclosed herein can include cloud-based systems such as AWS, GCE and Microsoft Azure®. Virtual machines provided in such systems can be used to implement at least portions of one or more of a computer system and an enterprise context platform in illustrative embodiments. These and other cloud-based systems in illustrative embodiments can include object stores such as AWS S3, GCE Cloud Storage, and Microsoft Azure® Blob Storage.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
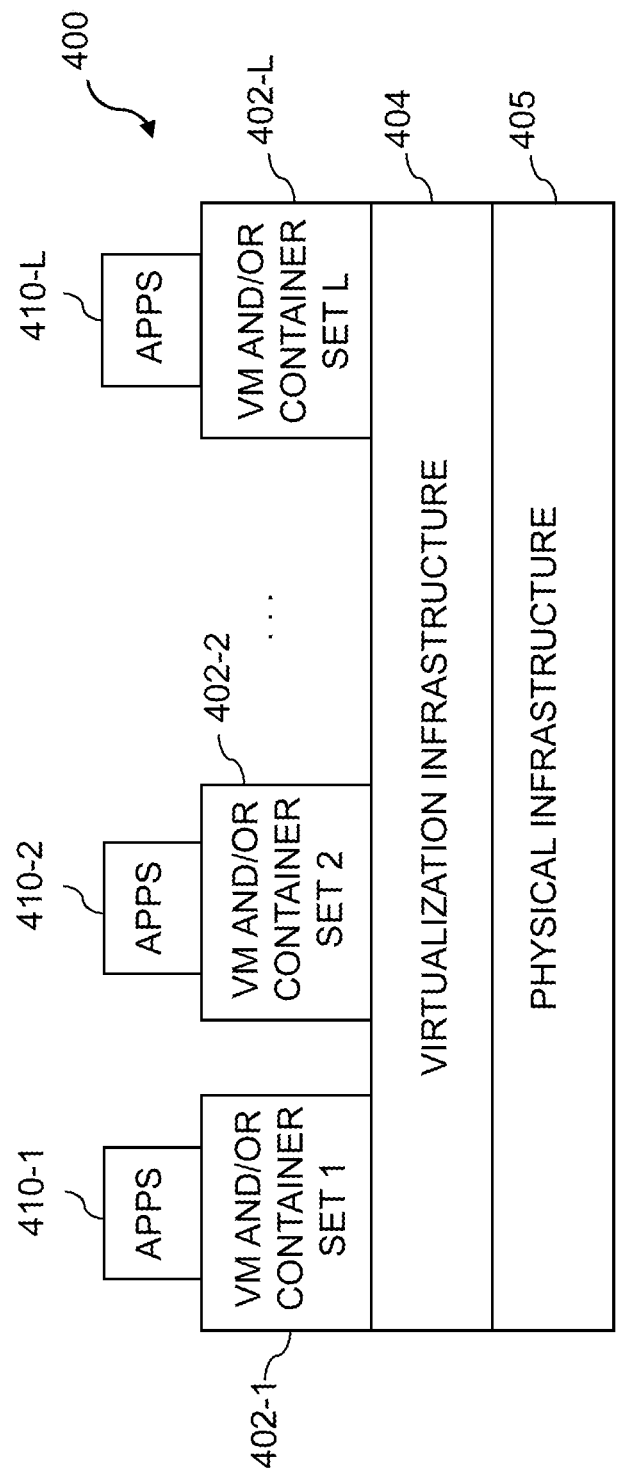
FIGS. 4 and 5 show examples of processing platforms that may be utilized to implement at least a portion of an information processing system in illustrative embodiments.
Figure 5:
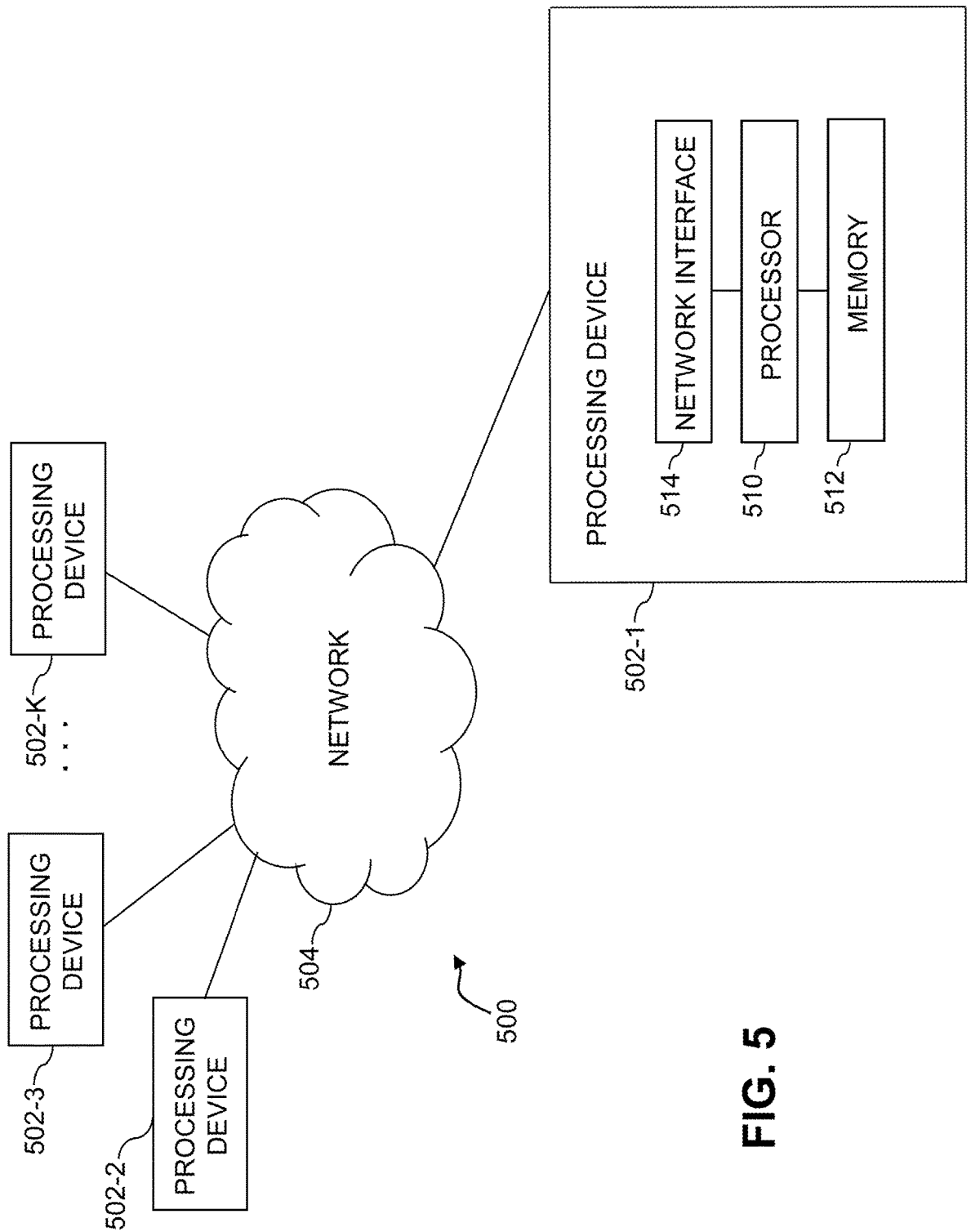

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide records enterprise context functionality of the type described above for one or more processes running on a given one of the VMs. For example, each of the VMs can implement records enterprise context for one or more processes running on that particular VM.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can provide records enterprise context functionality of the type described above for one or more processes running on different ones of the containers. For example, a container host device supporting multiple containers of one or more container sets can implement one or more instances of records enterprise context.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512. The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the enterprise context platform 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and enterprise context platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform:
   receiving usage data from a first operational management system, the first operational management system utilizing a plurality of assets of an information technology infrastructure;
   identifying, based at least in part on the received usage data, one or more asset relationships between at least two assets of the plurality of assets, and one or more user-asset relationships between one or more users and one or more of the plurality of assets;
   applying one or more parameters of a plurality of parameters to the identified asset and user-asset relationships to determine one or more designations associated with the identified asset and user-asset relationships; and
   transmitting the one or more designations to a second operational management system to trigger a risk management workflow based at least in part on the one or more designations;
   wherein, in applying the one or more parameters, said at least one processing platform identifies a volume of communications for a given asset of at least one of a given asset relationship and a given user-asset relationship;
   wherein the one or more parameters comprises a rule that if the identified volume of communications exceeds a threshold volume, then the given asset is designated as a high priority asset for the risk management workflow; and wherein the given asset is dynamically identifiable as a component of at least one of the given asset relationship and the given user-asset relationship based at least in part on the usage data comprising one or more of packet activity data, source data and destination data.

2. The apparatus of claim 1 wherein the one or more designations comprise a characterization of one or more risks associated with the identified asset and user-asset relationships.

3. The apparatus of claim 1 wherein the usage data comprises at least one of network traffic data, identification data for the plurality of assets, and asset communication log data.

4. The apparatus of claim 1 wherein the usage data comprises metadata corresponding to communications between the at least two assets associated with the identified one or more asset relationships.

5. The apparatus of claim 1 wherein said at least one processing platform further determines a frequency of communication between entities of the given asset relationship, and between entities of the given user-asset relationship.

6. The apparatus of claim 1 wherein said at least one processing platform further identifies a location where one or more of the plurality of assets is hosted.

7. The apparatus of claim 1 wherein said at least one processing platform further determines whether the given user-asset relationship comprises one of an enterprise relationship and a dedicated function relationship based at least in part on at least one of a number of users associated with the given user-asset relationship and a category of users associated with the given user-asset relationship.

8. The apparatus of claim 1 wherein said at least one processing platform further maintains a catalog associating the plurality of assets with one or more asset types.

9. The apparatus of claim 1 wherein, in applying the one or more parameters, said at least one processing platform identifies a category of users associated with the given user-asset relationship.

10. The apparatus of claim 1 wherein the volume of communications comprises one or more periods of relatively high communication volume relative to other periods of relatively low communication volume.

11. The apparatus of claim 1 wherein, in applying the one or more parameters, said at least one processing platform determines whether the given asset of the plurality of assets comprises at least one of personally identifiable information and electronic protected health information.

12. The apparatus of claim 1 wherein, in applying the one or more parameters, said at least one processing platform compares a number of users accessing the given asset of the plurality of assets with a threshold number of users to determine whether a relatively high number of users are accessing the given asset.

13. The apparatus of claim 1 wherein the one or more parameters comprise an asset utilization threshold.

14. The apparatus of claim 1 wherein said at least one processing platform further determines at least one of a type of data, a volume of the data and a growth rate of the data associated with the given asset of the plurality of assets.

15. The apparatus of claim 1 wherein the risk management workflow comprises prioritizing risk management based at least in part on at least one of time and location associated with use of the given asset of the plurality of assets.

16. A method comprising:

receiving usage data from a first operational management system, the first operational management system utilizing a plurality of assets of an information technology infrastructure;

identifying, based at least in part on the received usage data, one or more asset relationships between at least two assets of the plurality of assets, and one or more user-asset relationships between one or more users and one or more of the plurality of assets;

applying one or more parameters of a plurality of parameters to the identified asset and user-asset relationships to determine one or more designations associated with the identified asset and user-asset relationships; and transmitting the one or more designations to a second operational management system to trigger a risk management workflow based at least in part on the one or more designations;

wherein applying the one or more parameters comprises identifying a volume of communications for a given asset of at least one of a given asset relationship and a given user-asset relationship;

wherein the one or more parameters comprises a rule that if the identified volume of communications exceeds a threshold volume, then the given asset is designated as a high priority asset for the risk management workflow;

wherein the given asset is dynamically identifiable as a component of at least one of the given asset relationship and the given user-asset relationship based at least in part on the usage data comprising one or more of packet activity data, source data and destination data; and wherein the method is performed by at least one processing platform comprising at least one processing device comprising a processor coupled to a memory.

17. The method of claim 16 wherein the one or more designations comprise a characterization of one or more risks associated with the identified asset and user-asset relationships.

18. The method of claim 16 wherein the volume of communications comprises one or more periods of relatively high communication volume relative to other periods of relatively low communication volume.

19. A computer program product comprising a non-transitory processor-readable storage medium having stored therein program code of one or more software programs, wherein the program code when executed by at least one processing platform causes said at least one processing platform:

to receive usage data from a first operational management system, the first operational management system utilizing a plurality of assets of an information technology infrastructure;

to identify, based at least in part on the received usage data, one or more asset relationships between at least two assets of the plurality of assets, and one or more user-asset relationships between one or more users and one or more of the plurality of assets;

to apply one or more parameters of a plurality of parameters to the identified asset and user-asset relationships to determine one or more designations associated with the identified asset and user-asset relationships; and to transmit the one or more designations to a second operational management system to trigger a risk management workflow based at least in part on the one or more designations;

wherein, in applying the one or more parameters, the program code causes said at least one processing platform to identify a volume of communications for a given asset of at least one of a given asset relationship and a given user-asset relationship;
wherein the one or more parameters comprises a rule that if the identified volume of communications exceeds a threshold volume, then the given asset is designated as a high priority asset for the risk management workflow; and
wherein the given asset is dynamically identifiable as a component of at least one of the given asset relationship and the given user-asset relationship based at least in part on the usage data comprising one or more of packet activity data, source data and destination data.

20. The computer program product according to claim 19, wherein the one or more designations comprise a characterization of one or more risks associated with the identified asset and user-asset relationships.

* * * * *